United States Patent [19]
Sygnator et al.

[11] Patent Number: 5,154,670
[45] Date of Patent: Oct. 13, 1992

[54] APPARATUS FOR FORMING A WIRE NAIL

[75] Inventors: Henry A. Sygnator, Arlington Heights; John Binder, Morton Grove; Robert E. Bellock, Arlington Heights, all of Ill.

[73] Assignee: Illinois Tool Works, Inc., Glenview, Ill.

[21] Appl. No.: 726,058

[22] Filed: Jul. 5, 1991

Related U.S. Application Data

[62] Division of Ser. No. 597,025, Oct. 15, 1990, Pat. No. 5,056,976.

[51] Int. Cl.$^5$ ............................................. B21G 3/00
[52] U.S. Cl. ................................... 470/125; 470/121; 470/146; 470/40
[58] Field of Search ............... 10/43, 44, 49, 50, 51, 10/53, 57, 61, 28, 35, DIG. 4; 72/352, 357, 358, 316, 318, 322, 308, 309

[56] References Cited

U.S. PATENT DOCUMENTS

| | | | |
|---|---|---|---|
| 2,761,157 | 9/1956 | Chism | 10/53 |
| 3,095,588 | 7/1963 | Haubold | 10/43 |
| 3,109,187 | 11/1963 | Pirc | 10/53 |
| 3,234,572 | 2/1966 | Roser | 10/50 |
| 3,359,582 | 12/1967 | Powers | 10/53 |

FOREIGN PATENT DOCUMENTS

| | | | |
|---|---|---|---|
| 418918 | 9/1925 | Fed. Rep. of Germany | 10/57 |
| 0016648 | 1/1984 | Japan | 72/352 |
| 1395410 | 5/1988 | U.S.S.R. | 10/35 |
| 232841 | 4/1925 | United Kingdom | 10/57 |

Primary Examiner—Lowell A. Larson
Assistant Examiner—Michael J. McKeon
Attorney, Agent, or Firm—Schwartz & Weinrieb

[57] ABSTRACT

A wire nail with a head having a circumferential edge conforming to a complete circle and disposed in a radially offset relationship with respect to a shank. A flat surface on the shank provides a datum indicating where the shank is located. A flat surface on the shank provides a datum for orienting such nail and similar nails. In some embodiments, a tangent plane defined by means of a lower or underside portion of the head is oriented at an acute angle (75° to 85°) relative to the shank. In a strip of such (collated) nails, the flat surfaces defined upon the shanks define an open channel, which coacts with a rib integrally provided upon one wall of a nail-feeding mechanism. In a nail-making machine, two gripping members defining an annular recess and a punch are used to form such a nail from a wire of a malleable metal.

19 Claims, 4 Drawing Sheets

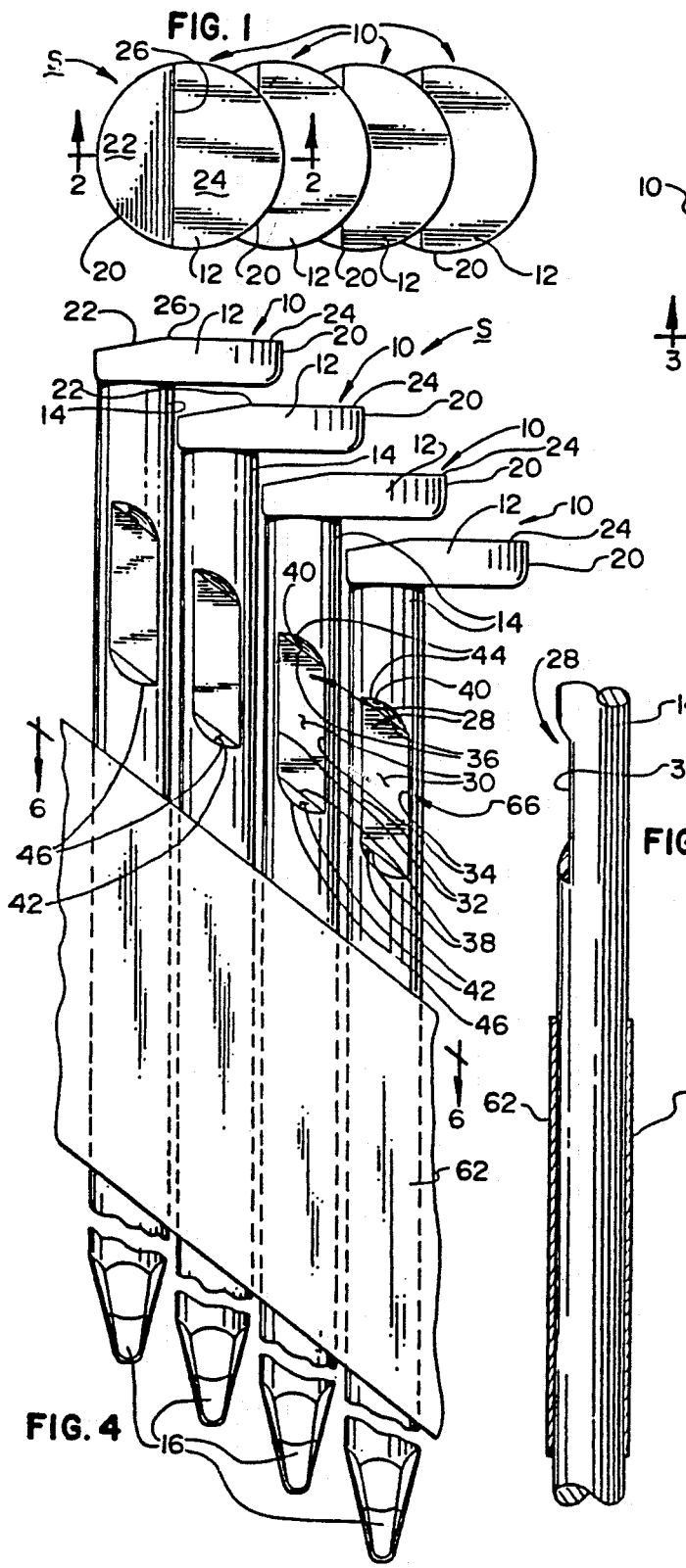

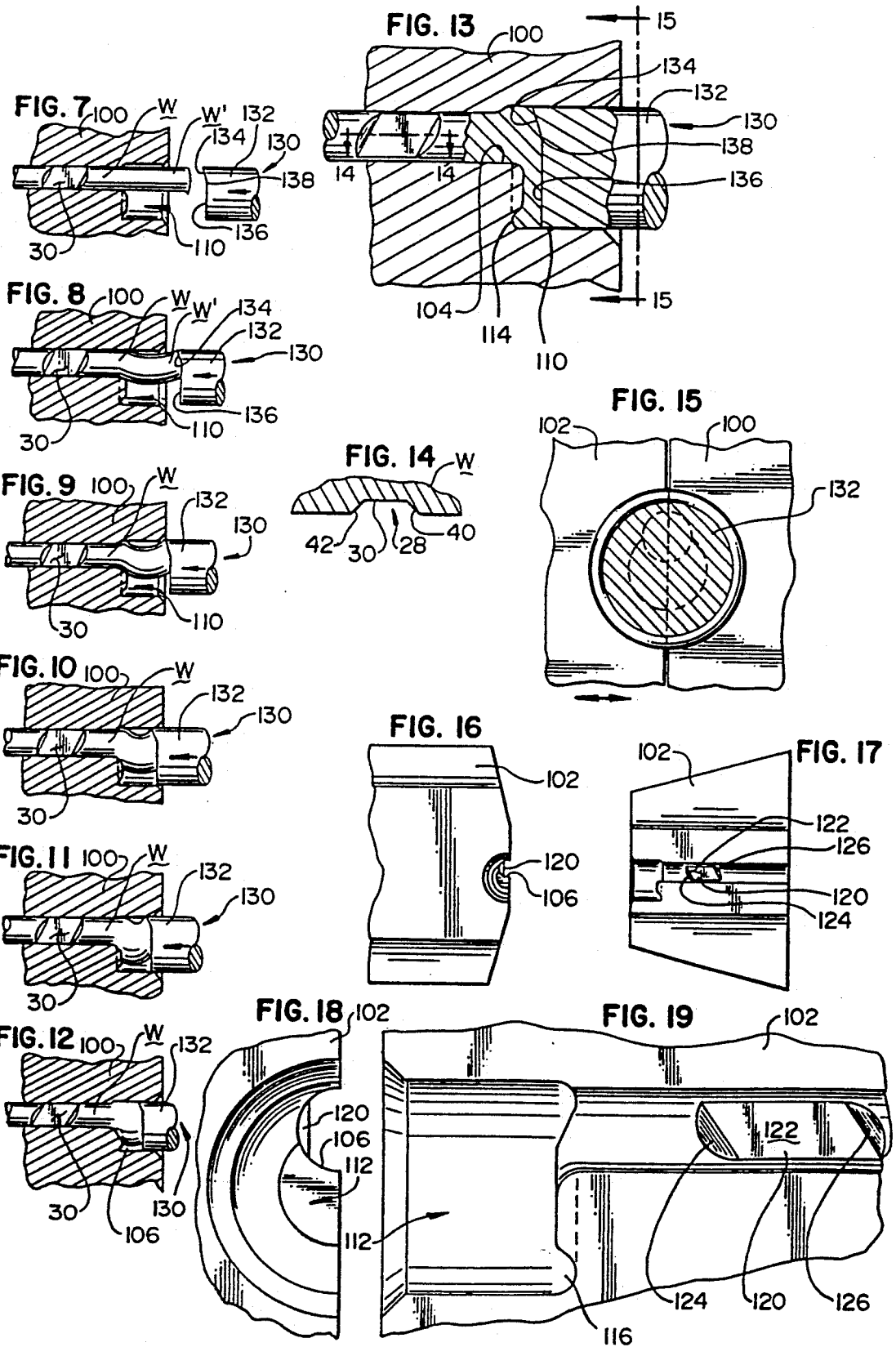

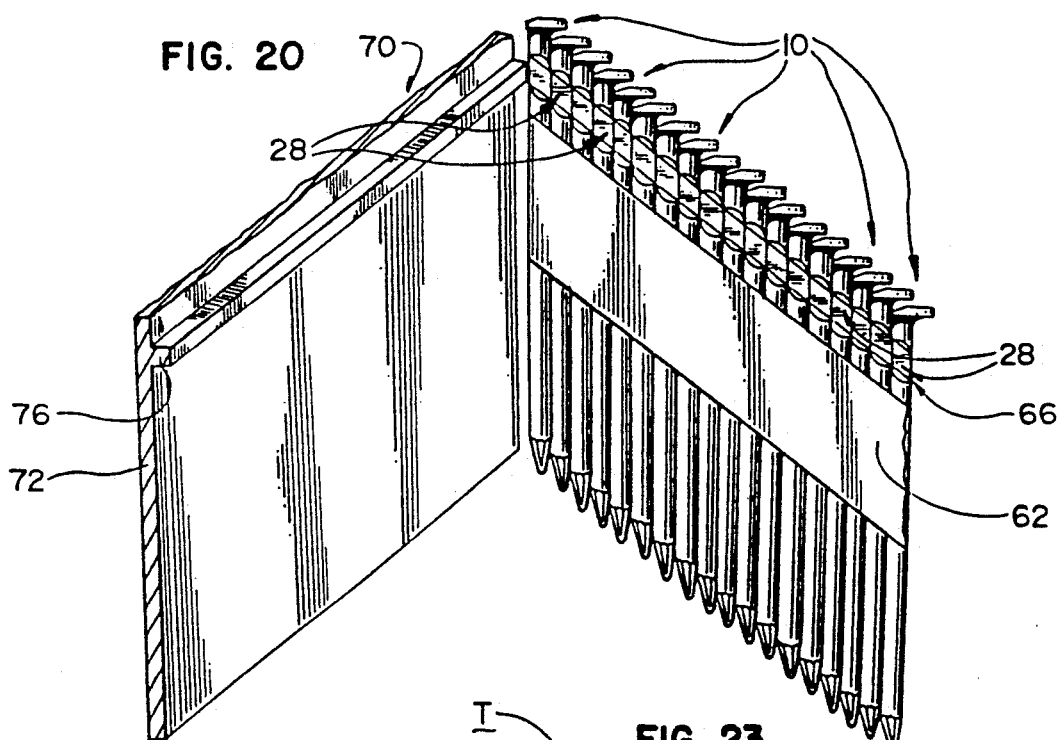
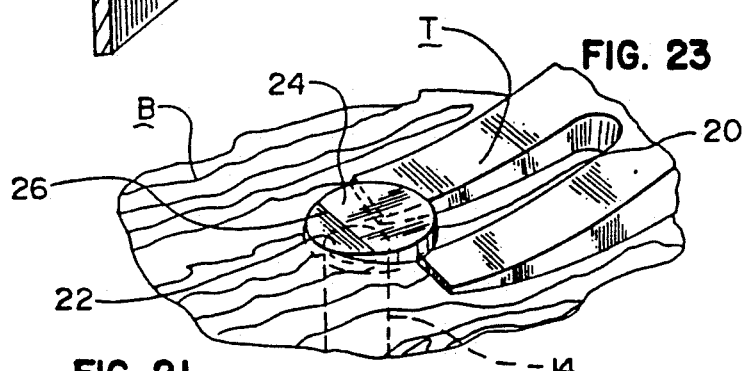
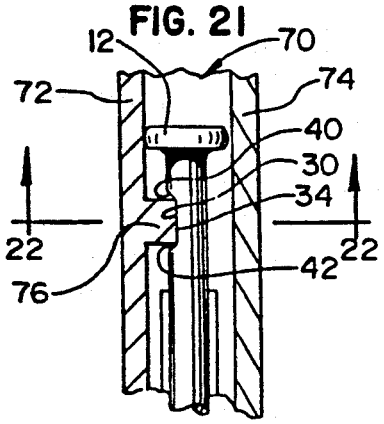
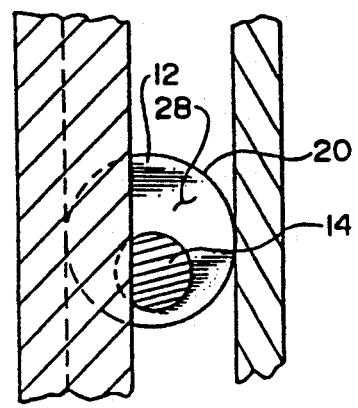

APPARATUS FOR FORMING A WIRE NAIL

TECHNICAL FIELD OF THE INVENTION

This application is a division of application Ser. No. 597,025, filed Oct. 15, 1990, now U.S. Pat. No. 5,056,976.

This invention pertains to wire nails, as used in pneumatically powered nail-driving tools, and to strips of such nails, as collated by means of adhesively applied tapes or other collating media. This invention provides wire nails having radially offset, circular heads and other unique features. Moreover, it pertains to related apparatus, as used to make such nails.

BACKGROUND OF THE INVENTION

Typically, as used in pneumatically powered or combustion-powered nail-driving tools, wire nails having D-shaped or variant heads are collated by means of adhesively applied tapes or other collating media so as to form a strip. The shanks of the collated nails are oriented in a closely spaced, parallel relationship with respect to one another and, except at one end of the strip, the head of each nail overlies the head of another nail.

Various strips of collated wire nails having D-shaped heads are exemplified in Lingle U.S. Pat. No. 3,152,334, Leistner U.S. Pat. No. 3,861,526, and Shelton et al. U.S. Pat. No. 3,966,042. Powers U.S. Pat. No. 3,359,582 discloses a die assembly for making a wire nail having such a head. Similar strips of collated wire nails having variant heads are exemplified in Juilfs U.S. Pat. No. 2,940,081 and Becht U.S. Pat. No. 3,481,459. None of the D-shaped or variant heads disclosed in the foregoing patents defines a complete circle when viewed axially.

For reasons of aesthetics and performance, it would be highly desirable to have a strip of collated nails wherein the shanks of the nails would be in a disposed closely spaced, parallel relationship with respect to one another and wherein, except at one end of the strip, the head of each nail would overlie the head of another nail, and wherein further the head of each nail would define a complete circle when viewed axially.

SUMMARY OF THE INVENTION

One feature of a wire nail constructed according to this invention is that the head of the nail has a circumferential edge conforming to a complete circle and wherein the axis of the head is radially offset with respect to the axis of the shank of the nail. Thus, as contrasted with the D-shaped and variant heads of the wire nails disclosed in the aforenoted patents, the head of a wire nail constructed according to this invention defines a complete circle when viewed axially.

A wire nail constructed according to this invention may have structure providing a locating datum on indicating where the shank is located after such nail has been driven into a substrate in such a manner that the shank is concealed. The locating datum facilitates removal of the wire nail from the substrate, by means of a nail-prying tool having a forked tip, by indicating in what direction the forked tip can be effectively inserted beneath the head of the nail so that the nail-prying tool can apply substantially equal leverage to opposite sides of the head.

Thus, in a preferred embodiment of such a nail, a top portion of the head has two planar surfaces spaced from the shank, namely a first surface providing the datum and a second surface intersecting the first surface along a line extending across the head. The first surface is oriented at an obtuse, included angle (such as, for example approximately 168) relative to the second surface and the second surface is oriented at a right angle relative to the axis of the head.

A lower portion of such a nail may have a cavity, which is bordered by means of an annular rib where the shank joins the head. The cavity tends to coact with a substrate, into which the nail is driven, so as to stabilize the nail head in a lateral sense.

In some embodiments, a lower portion of the head defines a tangent plane, which is oriented at a right angle relative to the axis of the head, and at an acute angle relative to the axis of the shank, preferably an acute angle within the range from approximately 75 to approximately 85. Advantageously, because of the acute angle, the wire nail may have greater holding capability.

It is preferred feature of the wire nail according to this invention that the shank is formed with a keyway, which defines a flat surface providing an orienting datum for orienting such nail and similar nails with their shanks in parallel relation to one another and with their heads offset in a common direction.

Thus, in a preferred embodiment, the flat surface of the keyway is parallel to the axis of the shank. Moreover, such surface may substantially conform to a parallelogram having two axially extending sides and two transversely extending sides, and such sides may define two acute angles and two obtuse angles.

As contemplated by means of this invention, a strip of similar, collated, wire nails is made by adhesively applying tapes to the shanks of such nails for collating such nails, or by suitably applying other collating media thereto, so as to collate such nails with their shanks oriented in a closely spaced, parallel relationship with respect to one another, and with their heads offset in a common direction relative to their shanks, so that the head of one such nail overlies the head of the next nail.

Moreover, the keyways noted above collectively define an open channel extending along the strip. The open channel may be advantageously used to guide the strip through a nail-feeding magazine having, on one wall, a lateral rib fitting into the open channel.

An important use of the keyways in collating the nails is disclosed in a copending application filed simultaneously herewith, under U.S. Ser. No. 597,022, now U.S. Pat. No. 5,058,228, and assigned commonly herewith. The copending application is entitled "Machine and Method for Collating Wire Nails Having Shank Keyways." The disclosure of the copending application is incorporated herein by reference.

It is contemplated by means of this invention that in a machine for making a wire nail from a wire of a malleable metal (such as for example carbon steel) improved wire-gripping and head-forming mechanisms are combined. Thus, the wire-gripping mechanism includes two gripping elements adapted to grip the wire therebetween in such a manner that one end of the wire projects from the gripping elements. The wire defines an axis where gripped. Also, the head-forming mechanism is designed so as to form a head by deforming some of the malleable metal including the projecting end in such a manner that the head has a circumferential edge, which may conform to a complete circle, in a radially offset relationship with respect to the axis defined by means of the wire where gripped.

It is preferred that each of the gripping elements has a recess out from which the projecting end projects. The recesses collectively define a cavity having an axis in a radially offset relationship with respect to the axis defined by means of the wire where gripped. Preferably, moreover, the nail head-forming mechanism includes a punch which is adapted to deform some of the malleable metal including the projecting end of the wire into a shape defined by means of the punch and by means of the cavity. Furthermore, the recess of each of the gripping elements may include an annular channel, whereupon the annular channels coact to define an annular rib upon the malleable metal deformed by means of the punch into such shape.

Thus, in a preferred embodiment which comprises a combination of the aforenoted mechanisms, the punch has a cylindrical tip defining an axis and is axially movable into the cavity. One end of the cylindrical tip has two planar surfaces intersecting at a vee extending across the cylindrical tip, namely a first surface and a second surface. The first surface is oriented at an obtuse, included angle (such as, for example, approximately 168) relative to the second surface and the second surface is oriented at a right angle relative to the axis of the punch. The first surface leads the second surface when the cylindrical tip is moved axially into the annular recess and is designed to laterally deform some of the malleable metal including the projecting end of the wire.

BRIEF DESCRIPTION OF THE DRAWINGS

These and other objects, features, and advantages of this invention will become evident from the following description of different embodiments of this invention with reference to the accompanying drawings, in which like reference characters designate like or corresponding parts throughout the several views, and wherein:

FIG. 1 is a plan view of a portion of a strip of collated wire nails according to a preferred embodiment of this invention.

FIG. 2, on a slightly enlarged scale compared to that of FIG. 1, is a sectional view taken through one of the wire nails, along line 2—2 of FIG. 1, in a direction indicated by means of the arrows.

FIG. 3 is a sectional view taken through the same nail, along line 3—3 of FIG. 2, in a direction indicated by means of the arrows.

FIG. 4 is an elevational view of the strip shown in FIG. 1. Portions of the shanks of the wire nails, between the tips of such nails and two collating tapes, have been omitted.

FIG. 5 is a fragmentary, elevational view of one of the wire nails and the collating tapes, as taken from one side of the strip shown in FIGS. 1 and 4.

FIG. 6 is a sectional view taken through the strip, along line 6—6 of FIG. 4, in a direction indicated by means of the arrows.

FIGS. 7 through 12, on a somewhat smaller scale as compared to that of FIGS. 1, 4, 5, and 6, and FIG. 13, on an intermediate scale, are sequential, fragmentary views of one of two gripping elements and an associated punch, as used to form a nail head upon an end of the wire used to form a wire nail according to the preferred embodiment of this invention. A portion of the punch, the head being formed, and an adjacent portion of the wire are shown in cross-section in FIG. 13.

FIG. 14 is a sectional view taken through the nail being formed, along line 14—14 of FIG. 13, in a direction indicated by means of the arrows.

FIG. 15 is a sectional view taken through the gripping elements, the punch, and the nail being formed, along line 15—15 of FIG. 13, in a direction indicated by means of the arrows.

FIG. 16 is a fragmentary, elevational view of one of the gripping elements, namely the gripping element not shown in FIG. 13, as taken in an axial direction relative to a wire which is to be gripped by means of the gripping elements.

FIG. 17 is an elevational view of the gripping element shown in FIG. 16, as taken to show its gripping face.

FIG. 18 is a greatly enlarged detail view taken from FIG. 16.

FIG. 19 is a greatly enlarged detail view taken from FIG. 17.

FIG. 20 is a fragmentary, partly exploded view of the strip of collated wire nails, as associated with a nail-feeding magazine of a nail-driving tool. The nail-feeding magazine is shown in a simplified representation.

FIG. 21 is a fragmentary, cross-sectional view taken through the nail-feeding magazine, so as to show one such nail being fed through the nail-feeding magazine.

FIG. 22 is a fragmentary, cross-sectional view taken along line 22—22 in FIG. 21, in a direction indicated by means of the arrows.

FIG. 23 is a fragmentary, perspective view of one such nail, as driven into a wooden board, and as associated with a nail-prying tool having a forked tip.

DETAILED DESCRIPTION OF ILLUSTRATED EMBODIMENTS

Figure 24:
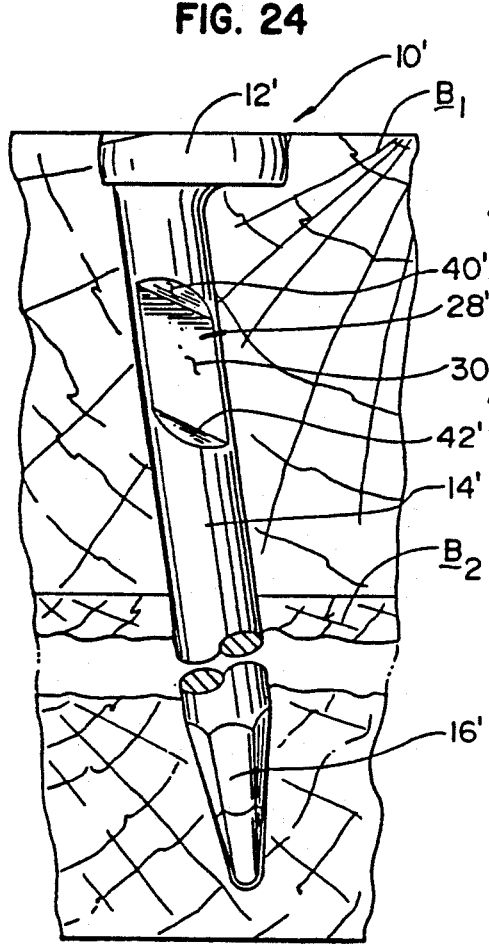
FIG. 24 is a fragmentary, elevational view of a wire nail according to an alternate embodiment of this invention, as used to join two wooden members, which are shown in cross-section.

While certain embodiments of this invention are illustrated in the drawings and are described below, it is to be here understood that this invention is not limited to those embodiments.

A strip S of collated wire nails 10, each formed according to a preferred embodiment of this invention, is shown in FIGS. 1, 4, 5, and 6.

An exemplary nail 10 is described below. The nail 10 has a unique head 12, by means of which the nail 10 is distinguished from wire nails known heretofore, and other unique features.

The nail 10 has a shank 14 integral with the head 12. The shank 14 defines an axis and has a tip 16. Preferably, as shown, the tip 16 conforms to the unique tip disclosed in Sygnator U.S. Pat. No. 4,927,309, the disclosure of which is incorporated herein by reference. Alternatively, the shank 12 may have a conventional tip (not shown) having four facets.

It is a feature of this invention that the head 12 has a circumferential edge 20 conforming to a complete circle and defining an axis which is radially offset with respect to the axis of the shank 14. Thus, in other words, the head 12 is radially offset in one direction relative to the shank 14.

As contrasted with the D-shaped and variant heads disclosed in the various patents noted in the third paragraph above, the head 12 defines a complete circle when viewed axially. Thus, the head 12 offers a better appearance when viewed axially. In addition, the head 12 may offer greater holding capability when the wire nail 10 is used to join two substrates, such as for example wooden boards.

The head 12, at a top portion, has two planar surfaces spaced from the shank 14, namely a first surface 22 and a second surface 24. The second surface 24 intersects the first surface 22 along a crest 26, which extends across the head 12, which has a small radius (approximately 0.093 inch) and which is shorter than the diameter of the complete circle defined by means of the circumferential edge 20 of the head 12. The first surface 22 is oriented at an obtuse, included angle of approximately 0.168 relative to the second surface 24 and the second surface 24 is oriented at a right angle relative to the axis of the shank 14.

As shown in FIG. 24, the first surface 22 provides an indicating datum indicating where the shank 14 is located after the wire nail 10 has been driven into a wooden board B or some other substrate (not shown) in such a manner that the shank 14 is concealed. The datum provided by means of the first surface 22 facilitates removal of the wire nail 10 from the board B or other substrate, by means of a nail-prying tool having a forked tip T, by indicating in what direction the forked tip T can be effectively inserted beneath the head 12 so that the nail-prying tool can apply substantially equal leverage to opposite sides of the head 12.

The shank 14 is formed with a keyway 28 defining a flat surface 30, which is disposed within a plane which is parallel to the axis of the shank 14 and to the direction of radial offset of the head 12 relative to the shank 14, and which is axially spaced beneath the head 12. The flat surface 30 conforms to a parallelogram having two longer, axially extending sides 32, 34, and two shorter, transversely extending sides 36, 38. These longer and shorter sides define two acute angles (such as, for example, approximately 34 each) and two obtuse angles (such as for example, approximately 146 each) as shown.

The keyway 28 is bounded by means of two flat surfaces 40, 42, which respectively intersect the flat surface 30 at the shorter sides 36, 38. The flat surface 40 is bounded by the side 36 and by a means of a curved edge 44 and is oriented at an angle of approximately 45 relative to the axis of the shank 14. The flat surface 42 is bounded by means of the side 38 and by means of a curved edge 46 and is oriented at an angle of approximately 45 relative to the axis of the shank 14 and at a right angle relative to the flat surface 40.

The keyway 28 provides a datum for orienting the collated nails 10 with their shanks 14 disposed parallel to one another and with their heads 12 offset in a common direction relative to their shanks 14.

Within an undersider region, the head 12 of the nail 10 has a cavity 50, which is bordered by means of an annular rib 52 except where the shank 14 joins the head 12. As contrasted with a head (not shown) that is planar at its lower portion, the head 12 tends to be less prone to separating from the shank 14, particularly if the head 12 is struck at a localized region spaced from the shank 14, such as, for example where suggested by means of the downwardly directed wide arrow in FIG. 2. Moreover, the cavity 50 tends to coact with a substrate, into which the nail 10 is driven, so as to stabilize the nail head 12 in a lateral sense.

At the annular rib 52, the lower portion of the head 12 defines a tangent plane, which is oriented at a right angle relative to the axis of the head 12, and at a right angle relative to the shank 14. The preferred embodiment shown in FIGS. 1 through 6 and other views may thus be distinguished from an alternate embodiment shown in FIGS. 24 and 25, and from a simplified embodiment shown in FIG. 26.

As shown in FIGS. 4, 5, and 6, the collated nails 10 of the strip S are collated by means of conventional collating tapes 62, 64, applied adhesively to opposite sides of the shanks 14 of the collated nails 10, in parallel relation to the flat surfaces 30 defined by means of the keyways 28 upon the shanks 14 of the collated nails 10. The collating tapes 62, 64, are oriented at an acute angle (such as, for example approximately 36) relative to a plane normal to the axes of the shanks 14 of the collated nails 10 so as to be substantially parallel to the shorter sides 36, 38, of such flat surfaces 30.

The nails 10 in the strip S are collated in such a manner that their shanks 14 are oriented in a closely spaced, parallel relationship with respect to one another, whereby their shanks 14 may be nearly contiguous to one another. The nails 10 in the strip S are collated in such a manner that their heads 12 are offset in a common direction relative to their shanks 14 and in a manner that, except at one end of the strip S (its right end in FIG. 4) where the nail 10 to be first or next driven is located, the head 12 of each nail 10 overlies the head 12 of another nail 10.

Collectively, as shown, the keyways 28 defined upon the shanks 14 of the collated nails 10 define an open channel 66, which extends along the strip S. As shown in FIGS. 20, 21, and 22, the open channel 66 is useful in guiding the strip S through a nail-feeding magazine 70 having two opposed walls 72, 74, and other structures (not shown) of known types to a pneumatically powered or combustion-powered nail-driving tool (not shown) of a known type.

The wall 72 facing the keyways 28 has an integral, lateral rib 76 disposed within the open channel 66, whereby the rib 76 guides the strip S as the strip S is fed through the nail-feeding magazine 70.

As explained above, an important use of such keyways in collating such nails is disclosed in the aforementioned, copending application, the disclosure of which is incorporated herein by reference.

Manufacture of an exemplary nail 10 is described below. The wire nail 10 is formed from a wire of a malleable metal, such as for example carbon steel, which is preferred. The wire nail 10 can be effectively formed in a nail-making machine of a known type, such as for example a Wafios Model N51 Nail-Making Machine, as available commercially from Wafios Maschinenfabrik GmbH & Co. KG of Reutingen, Federal Republic of Germany. Such a nail-making machine employs coactive wire-gripping and head-forming mechanisms. It is contemplated by means of this invention that, in such a nail-making machine, improved wire-gripping and head-forming mechanisms are employed in a coactive combination.

The wire-gripping mechanism comprises two gripping elements 100, 102, as seen for example in FIG. 15, which are made from tool steel, and which are arranged for relative movement toward and away from each other. The gripping element 100 is stationary and the gripping element 102 is movable. The gripping elements 100, 102, are adapted to grip a wire W (from which the wire nail 10 is made) in such a manner that one end W' of the wire W projects from the gripping elements 100, 102. The gripping elements 100, 102, respectively have semi-cylindrical channels 104, 106, defined therein which are shaped to receive the wire W when the movable element 102 is moved into contiguous relationship with respect to the stationary element 100. The wire W defines an axis where gripped and the projecting end W' projects axially.

The gripping elements 100, 102, respectively have recesses 110, 112, where the projecting end W' of the wire W projects. The recess 110 communicates with the semi-cylindrical channel 104. The recess 112 communicates with the semi-cylindrical channel 106. Collectively, the recesses 110, 112, coact to define a cavity, which has an axis which is radially offset with respect to the axis defined by means of the wire W where gripped.

The recess 110 includes an annular channel 114. The recess 112 includes an annular channel 116. When the recesses 110, 112, coact to define the cavity, the annular channels 114, 116, correspond to the annular rib 52 of the head 12 of the nail 10 being made.

The semi-cylindrical channel 106 of the movable element 102 is interrupted by means of a nub 120, which is integral with the movable element 102, and which is shaped so as to form the flat surface 30 and the flat surfaces 40, 42, along a portion of the wire W to become the shank 14 of the wire nail 10 being made. The nub 120 forms these surfaces by deforming some of the malleable material of the wire W, as the movable element 102 is moved into its contiguous relationship with respect to the stationary element 100. The nub 120 has a flat surface 122 corresponding to the flat surface 30, a flat surface 124 corresponding to the flat surface 40, and a flat surface 126 corresponding to the flat surface 42.

The head-forming mechanism comprises a punch 130, which is made from tool steel, and which is adapted to deform some of the malleable metal including the projecting end W' of the wire W into a shape defined by means of the punch 130 and by means of the cavity defined by means of the recesses 110, 112, that is into the shape of the head 12 of the wire nail 10 being made.

The punch 130 has a cylindrical tip 132, which defines an axis, and which conforms closely to the cavity defined by means of the recesses 110, 112, and which is movable axially into such cavity. The end of the cylindrical tip 132 has two planar surfaces, namely a first surface 134 and a second surface 136 intersecting the first surface 134 at a vee 138 extending across the cylindrical tip 132. The vee 138 has a slight radius (such as, for example approximately 0.093 inch) and is shorter than a diameter of the cylindrical tip 132. The first surface 134 is oriented at an obtuse, included angle of approximately 168° relative to the second surface 136 and the second surface 136 is oriented at a right angle relative to the axis of the punch 130. Thus, as shown at sequential stages in FIGS. 7 through 13, the first surface 134 leads the second surface 136 and is designed to deform some of the malleable metal including the projecting end W' of the wire W laterally, whereby the deformed metal fills inner reaches of the cavity defined by means of the recesses 110, 112.

When the projecting end W' of the wire W is formed into the head 12 of the wire nail 10 being made, the first surface 22 of the head 12 conforms closely to the first surface 134 of the end of the cylindrical tip 132 of the punch 130. Moreover, the second surface 24 of the head 12 conforms closely to the second surface 136 of the end of the cylindrical tip 132 of the punch 130. Furthermore, the annular rib 52 of the head 12 conforms closely to the annular channels 114, 116.

Figure 25:
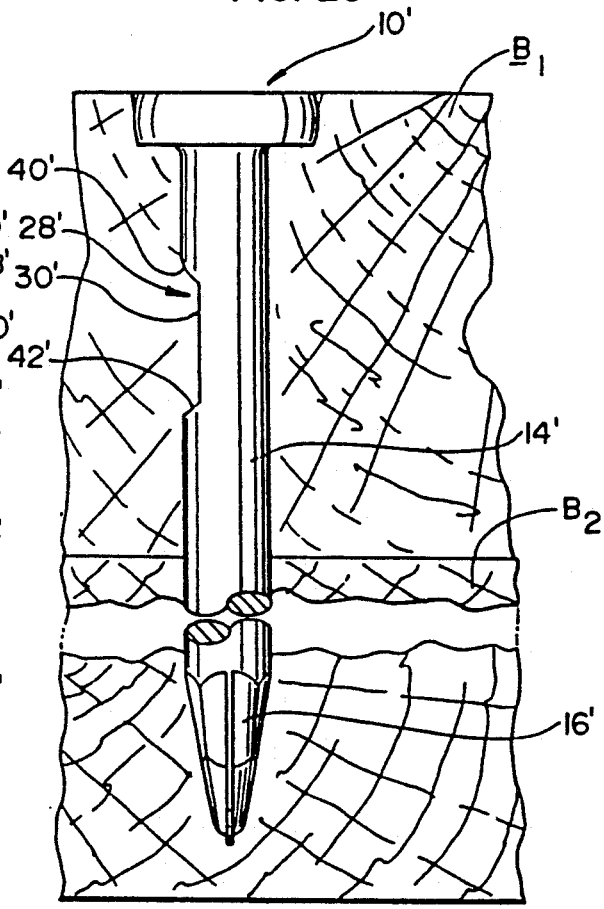
FIG. 25 is a fragmentary, elevational view of the nail shown in FIG. 24, as taken from a different side.

An alternate embodiment of this invention is disclosed in FIGS. 24 and 25, in which primed reference numbers are used to designate elements similar or analogous to elements designated by similar, unprimed reference numbers in FIG. 1 and other views.

Thus, as shown in FIGS. 24 and 25, a wire nail 10' according to the alternate embodiment of this invention has a head 12', which conforms to the head 12 of the wire nail 10. Also, the wire nail 10' has a shank 14', which is similar to the shank 14 of the wire nail 10 except as explained herein. Thus, the shank 14' has a keyway 28' with flat surfaces 30', 40', 42', which correspond respectively to the keyway 28 with flat surfaces 30, 40, 42, defined upon the shank 14 of the wire nail 10. Also, the shank 14' is formed with a tip 16', which conforms to the tip 16 of the wire nail 10 and to the unique tip disclosed in the Sygnator patent noted above.

Upon an underside portion, the head 12' of the wire nail 10' defines a tangent plane, which is oriented at a right angle relative to the axis of the head 12', but at an acute angle relative to the axis of the shank 14'. Preferably, as shown, the acute angle is within the range from approximately 75 to approximately 85. Advantageously, as compared to the preferred embodiment described above, the wire nail 10' may have greater holding capability when driven through an upper substrate $B_1$, such as for example a wooden board, into a lower substrate $B_2$, such as for example a wooden board.

Figure 26:
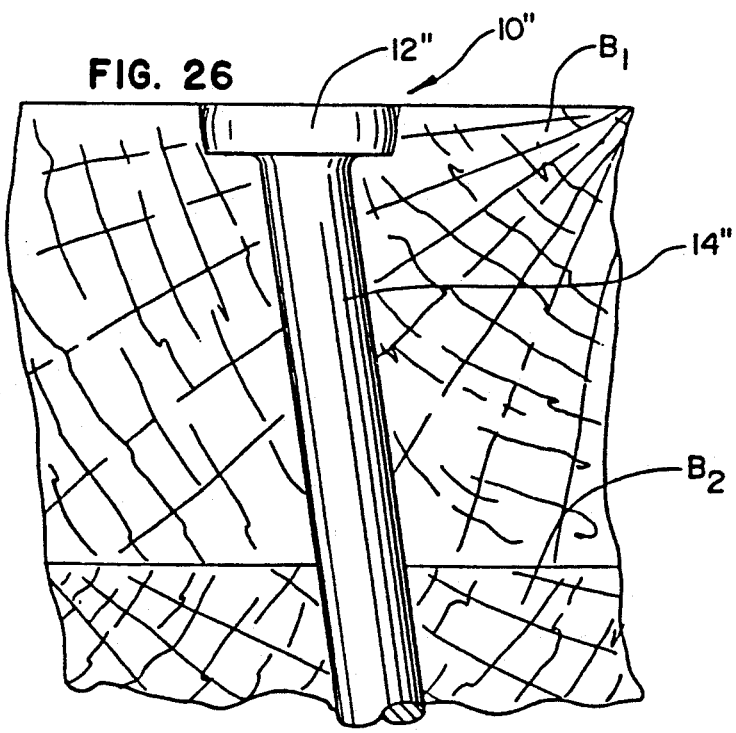
FIG. 26 is a fragmentary, elevational view of a wire nail according to a simplified embodiment of this invention, as used to join two wooden members, which are shown in cross-section.

A wire nail 10' according to a simplified embodiment of this invention is shown in FIG. 26, as driven through an upper substrate $B_1$, such as for example a wooden board, into a lower substrate $B_2$, such as for example a wooden board. In FIG. 26, double-primed reference numbers are used to designate elements similar or analogous to elements designated by similar, unprimed reference numbers in FIGS. 1 through 6 and other views.

The wire nail 10" has a head 12", which defines an axis, and a shank 14", which defines an axis, and which is joined integrally with the head 12". The head 12" is similar to the heads of wire nails (not shown) in common use. The shank 14" is similar to the shanks of such nails. The wire nail 10" has a tip (not shown) similar to the tips of such nails. However, the wire nail 10" is similar to the wire nail 10' described above and differs from wire nails in common use in that, at a upon an underside portion, the head 12" defines a tangent plane, which is oriented at a right angle relative to the axis of the head 12", but at an acute angle relative to the axis of the shank 14".

Various modifications may be made in the illustrated embodiments without departing from the scope and spirit of this invention. It is therefore to be understood that within the scope of the appended claims, the present invention may be practiced otherwise than as specifically described herein.

We claim:

1. Apparatus for forming a nail from a wire formed from a malleable metal, comprising:
    means including a pair of gripping elements for gripping said wire between said gripping elements in such a manner that one end of said wire projects outwardly from said gripping elements, said wire defining a shank of said nail having a longitudinal axis; and means for forming a head upon said wire, by deforming a portion of said malleable metal comprising said one projecting end of said wire, in such a manner that said head has a circumferential edge defining a complete circle and an axis which is radially offset with respect to said axis of said shank such that a peripheral portion of said shank is disposed substantially tangential to a respective circumferential edge portion of said head.

2. Apparatus as set forth in claim 1, wherein:

each of said gripping elements comprises a recess wherein said projecting end of said wire is disposed, said recesses coacting together so as to define a cavity having an axis which is disposed in a radially offset relationship with respect to said axis of said shank and within which said head of said nail is formed; and wherein said head-forming means comprises a punch movable into said cavity for deforming said portion of said malleable metal into a predetermined configuration defined by said punch and said cavity.

3. Apparatus as set forth in claim 2, wherein:

said punch comprises a cylindrical end portion defining an axis which is coaxially disposed with respect to said cavity, said end portion comprising two planar surfaces intersecting each other along a plane extending across said end portion, a first one of said two planar surfaces being disposed at an obtuse angle with respect to a second one of said two planar surfaces, said second one of said two planar surfaces being disposed within a plane which is substantially perpendicular to said axis of said punch, and said first one of said two planar surfaces leading said second one of said two planar surfaces as said cylindrical end portion of said punch enters said cavity so as to laterally deform said portion of said malleable metal within said cavity.

4. Apparatus as set forth in claim 3, wherein:
said obtuse angle is approximately 168°.

5. Apparatus as set forth in claim 2, wherein:

said recess of each one of said gripping element comprises an annular channel, said channels coacting together so as to define an annular rib upon said head of said nail as formed from said malleable metal by means of said punch and said cavity.

6. Apparatus as set forth in claim 1, wherein:
said gripping elements comprise semi-cylindrical elements.

7. Apparatus for forming a nail from a wire formed from a malleable metal, comprising:

means including a pair of gripping elements for gripping said wire between said gripping elements in such a manner that one end of said wire projects outwardly from said gripping elements, said wire defining a shank of said nail having a longitudinal axis; and means for forming a head upon said wire, by deforming a portion of said malleable metal comprising said projecting end of said wire, in such a manner that said head has a circumferential edge and an axis which is radially offset with respect to said axis of said shank when said wire is viewed axially;

said head forming means comprising an end portion defined by means of two planar surfaces intersecting each other along a plane extending across said end portion, a first one of said two planar surfaces being disposed at an obtuse angle with respect to a second one of said two planar surfaces for forming a first planar surface upon said head of said wire, which is disposed at an obtuse angle with respect to a second planar surface of said head of said wire, and which is disposed above said shank of said nail so as to be disposed at an angle with respect to said axis of said head and thereby serve as an indicating datum for indicating where said shank of said nail is located after said nail is driven into a substrate within which said shank is concealed while said second planar surface of said head of said wire nail is disposed perpendicular to said axis of said head of said wire nail.

8. The combination of claim 7 wherein each of said gripping elements has a recess where said projecting end of said wire projects said recesses coacting to define a cavity having an axis defined in a radially offset relationship with respect to said axis defined by said wire where gripped, and wherein said head-forming means comprises a punch adapted to deform said portion of said malleable metal including said projecting end of said wire into a shape defined by said punch and by said cavity.

9. Apparatus as set forth in claim 8, wherein:
said obtuse angle is approximately 168°.

10. The combination of claim 8 wherein said punch has an axis and has a cylindrical tip being movable into said recesses and having said end portion of said two planar surfaces, namely said first surface and said second surface intersecting said first surface at a vee extending across said cylindrical tip, said first surface being oriented at said obtuse, included angle relative to said second surface, said second surface being oriented at a right angle relative to said axis of said punch, said first surface leading said second surface when said cylindrical tip is moved axially into said cavity and constituting said means for deforming said portion of said malleable metal including said projecting end of said wire laterally.

11. The combination of claim 10 wherein the included angle is approximately 168°.

12. The combination of claim 8 wherein said recess of each of said gripping elements includes an annular channel, said annular channels coacting together so as to define an annular rib upon malleable metal deformed by said punch into said shape defined by said punch and by said cavity.

13. Apparatus as set forth in claim 7, wherein:
said obtuse angle is approximately 168°.

14. Apparatus as set forth in claim 7, wherein:
said gripping elements comprise semi-cylindrical elements.

15. Apparatus for forming a nail from a wire formed from a malleable metal, comprising:

means including a pair of gripping elements for gripping said wire between said gripping elements in such a manner that one end of said wire projects outwardly from said gripping elements, said wire defining a shank of said nail having a longitudinal axis; and means for forming a head upon said wire, by deforming a portion of said malleable metal comprising said projecting end of said wire, in such a manner that said head has a circumferential edge and an axis which is radially offset with respect to said axis of said shank when said wire is viewed axially;

said head forming means comprising means for forming an annular channel for defining an annular rib, upon said head of said nail as said head is formed from said portion of said malleable metal comprising said projecting end of said wire, which surrounds a circular cavity within said head of said nail wherein said annular rib and said circular cavity of said head of said nail serve to laterally stabilize said head of said nail with respect to a substrate into which said nail is driven.

16. Apparatus as set forth in claim 15, wherein:

each of said gripping elements comprises a recess wherein said projecting end of said wire is disposed, said recesses coacting together so as to define a cavity having an axis which is disposed in a radially offset relationship with respect to said axis of said shank and within which said head of said nail is formed; and wherein said head-forming means comprises a punch movable into said cavity for deforming said portion of said malleable metal into a predetermined configuration defined by said punch and said cavity.

17. Apparatus as set forth in claim 16, wherein:

said punch comprises a cylindrical end portion defining an axis which is coaxially disposed with respect to said cavity, said cylindrical end portion of said punch comprising two planar surfaces intersecting each other along a plane extending across said cylindrical end portion, a first one of said two planar surfaces being disposed at an obtuse angle with respect to a second one of said two planar surfaces for forming a first planar surface upon said head of said wire nail, which is disposed at an obtuse angle with respect to a second planar surface of said head of said wire nail, and which is disposed above said shank of said nail so as to be disposed at an angle with respect to said axis of said head and thereby serve as an indicating datum for indicating where said shank of said nail is located after said nail is driven into a substrate within which said shank is concealed, while said second planar surface of said head of said wire nail is disposed perpendicular to said axis of said head of said wire nail.

18. Apparatus as set forth in claim 17, wherein:

said obtuse angle is approximately 168°.

19. Apparatus as set forth in claim 15, wherein:

said gripping elements comprise semi-cylindrical elements.

* * * * *